United States Patent
Yang et al.

(10) Patent No.: US 9,529,484 B2
(45) Date of Patent: Dec. 27, 2016

(54) CAPACITIVE TOUCH STRUCTURE USING BLOCK ELECTRODES TO REDUCE WIRING

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Weijie Zhao, Beijing (CN); Yingming Liu, Beijing (CN)

(73) Assignees: BOE TECHNOLOGY GROUP CO., LTD., Beijing (CN); BEIGING BOE OPTOELECTRONICS TECHNOLOGY CO., LTD., Beiging (CN)

( * ) Notice: Subject to any disclaimer, the term of this patent is extended or adjusted under 35 U.S.C. 154(b) by 42 days.

(21) Appl. No.: 14/443,271

(22) PCT Filed: Sep. 30, 2014

(86) PCT No.: PCT/CN2014/087948
§ 371 (c)(1),
(2) Date: May 15, 2015

(87) PCT Pub. No.: WO2015/180356
PCT Pub. Date: Dec. 3, 2015

(65) Prior Publication Data
US 2016/0282976 A1   Sep. 29, 2016

(30) Foreign Application Priority Data

May 30, 2014 (CN) .......................... 2014 1 0240507

(51) Int. Cl.
*G06F 3/041* (2006.01)
*G06F 3/044* (2006.01)

(52) U.S. Cl.
CPC ............. *G06F 3/044* (2013.01); *G06F 3/0412* (2013.01); *G06F 3/0416* (2013.01)

(58) Field of Classification Search
CPC ...... G06F 3/044; G06F 3/0412; G06F 3/0416; G06F 2203/04104; G06F 2203/04107
See application file for complete search history.

(56) References Cited

U.S. PATENT DOCUMENTS

| | | | | |
|---|---|---|---|---|
| 2006/0097991 A1* | 5/2006 | Hotelling | ............... | G06F 3/0416 345/173 |
| 2012/0306802 A1* | 12/2012 | McCracken | .......... | G06F 3/0416 345/174 |

(Continued)

FOREIGN PATENT DOCUMENTS

| | | |
|---|---|---|
| CN | 101923419 A | 12/2010 |
| CN | 202677328 A | 1/2013 |

(Continued)

OTHER PUBLICATIONS

International Search Report mailed Feb. 27, 2015; PCT/CN/2014/087948.

(Continued)

*Primary Examiner* — Larry Sternbane
(74) *Attorney, Agent, or Firm* — Ladas & Parry LLP

(57) ABSTRACT

A capacitive touch structure, an in-cell touch panel, a display device and a scanning method thereof are disclosed. The capacitive touch structure includes: self-capacitance electrodes; block electrodes disposed in the same layer as self-capacitance electrodes; first wires connected with self-capacitance electrodes; second wires connected with block electrodes; and a touch sensing chip connected with the first wires and the second wires. There are at least adjacent (Continued)

self-capacitance electrodes that satisfy the following conditions: at least two block electrodes are provided between any two adjacent self-capacitance electrodes each of which corresponds to one self-capacitance electrode; block electrodes of one self-capacitance electrode are connected with the same second wire, block electrodes of adjacent self-capacitance electrodes are connected with different second wires, and one second wire is connected with block electrodes of at least two self-capacitance electrodes.

20 Claims, 11 Drawing Sheets

(56) References Cited

U.S. PATENT DOCUMENTS

| | | | | |
|---|---|---|---|---|
| 2012/0319974 | A1* | 12/2012 | Kim | G06F 3/044 |
| | | | | 345/173 |
| 2013/0342479 | A1 | 12/2013 | Pyo et al. | |
| 2014/0152579 | A1* | 6/2014 | Frey | G06F 3/044 |
| | | | | 345/173 |
| 2015/0160754 | A1* | 6/2015 | Wenzel | G06F 3/044 |
| | | | | 345/174 |
| 2015/0227229 | A1* | 8/2015 | Schwartz | G06F 3/044 |
| | | | | 345/174 |

FOREIGN PATENT DOCUMENTS

| | | |
|---|---|---|
| CN | 103793120 A | 5/2014 |
| CN | 103809801 A | 5/2014 |
| CN | 104020912 A | 9/2014 |

OTHER PUBLICATIONS

International Search Report mailed Feb. 27, 2015; PCT/CN2014/087948.

Written Opinion of the International Searching Authority dated Feb. 15, 2015; PCT/CN2014/087948.

\* cited by examiner

CAPACITIVE TOUCH STRUCTURE USING BLOCK ELECTRODES TO REDUCE WIRING

TECHNICAL FIELD

Embodiments of the present invention relate to a capacitive touch structure, an in-cell touch panel, and a display device and a scanning method thereof.

BACKGROUND

With the fast development of display technology, touch screen panels have become popular in people's life gradually. At present, touch structures in touch panels can be classified into mutual capacitance touch structures and self-capacitance touch structures. For self-capacitance touch structures, because accuracy and signal-to-noise ratio of touch sensing are high, they have received great attentions from panel manufacturers.

At present, self-capacitance touch structures utilize self-capacitance principle to implement detection of finger touch position. A plurality of self-capacitance electrodes disposed in the same layer and insulated from each other are provided in the touch structure. When a human body does not touch the screen, each self-capacitance electrode experiences capacitance of a fixed value. When a human body touches the screen, self-capacitance electrodes corresponding to the touch position experience capacitance that is the sum of the fixed value plus the body capacitance. The touch sensing chip can determine the touch position by detecting capacitance value variation of self-capacitance electrodes in the touch period.

SUMMARY

At least one embodiment of the present invention provides a capacitive touch structure, an in-cell touch panel, a display device and a scanning method thereof to reduce the number of wires in the self-capacitance touch structure, thereby reducing the probability of encountering problems that are adverse to narrow margin frame design and result in a large touch dead zone.

At least one embodiment of the present invention provides a capacitive touch structure comprising: a plurality of self-capacitance electrodes disposed in a same layer and insulated from each other; a plurality of block electrodes disposed in a same layer as the self-capacitance electrodes and insulated from the self-capacitance electrodes, wherein at least adjacent self-capacitance electrodes satisfy the following conditions: at least two block electrodes are provided between any two adjacent self-capacitance electrodes, and each of the at least two block electrodes corresponds to only one self-capacitance electrode; a plurality of first wires electrically connected with the self-capacitance electrodes while not intersecting each other, wherein the self-capacitance electrodes are each electrically connected with different first wires; a plurality of second wires electrically connected with the block electrodes while not intersecting each other, wherein block electrodes corresponding to one self-capacitance electrode are electrically connected with the same one second wire, block electrodes corresponding to adjacent self-capacitance electrodes are electrically connected with different second wires, and one of the second wires is electrically connected with block electrodes corresponding to at least two self-capacitance electrodes; and a touch sensing chip electrically connected with the first wires and second wires.

At least one embodiment of the present invention provides an in-cell touch panel comprising a top substrate and a bottom substrate disposed oppositely to each other and a capacitive touch structure as described in an embodiment of the present invention. the self-capacitance electrodes, block electrodes, first wires and second wires are disposed on a side of the top substrate that faces the bottom substrate or on a side of the bottom substrate that faces the top substrate.

At least one embodiment of the present invention provides a display device comprising the in-cell touch panel in an embodiment of the present invention.

At least one embodiment of the present invention provides a display device comprising an add-on mode touch panel comprising the capacitive touch structure described in an embodiment of the present invention.

At least one embodiment of the present invention provides a scanning method for the display device described in an embodiment of the present invention, comprising: conducting touch scanning and display scanning in a time-division manner in one frame period. In a touch scanning interval, the touch sensing chip applies driving signals to block electrodes at the same time through second wires and periphery wirings connected with block electrodes; and applies driving signals to self-capacitance electrodes in a time-division manner through first wires and periphery wirings connected with self-capacitance electrodes; receives feedback signals of self-capacitance electrodes and block electrodes, and determines touch positions according to feedback signals.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1A:
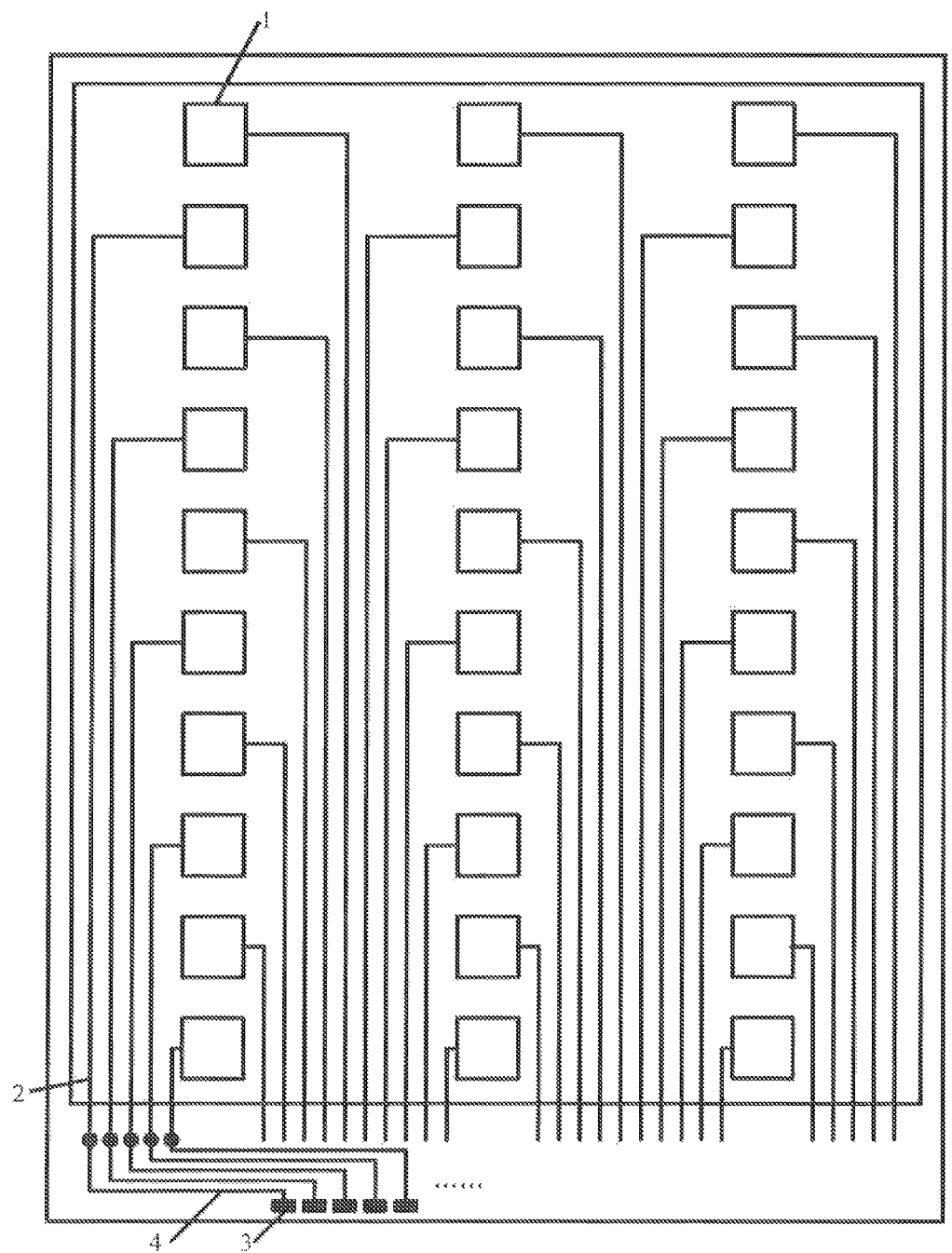
FIG. 1a is a top structural view of a capacitive touch structure in which wires and self-capacitance electrodes are disposed in the same layer.
Figure 1B:
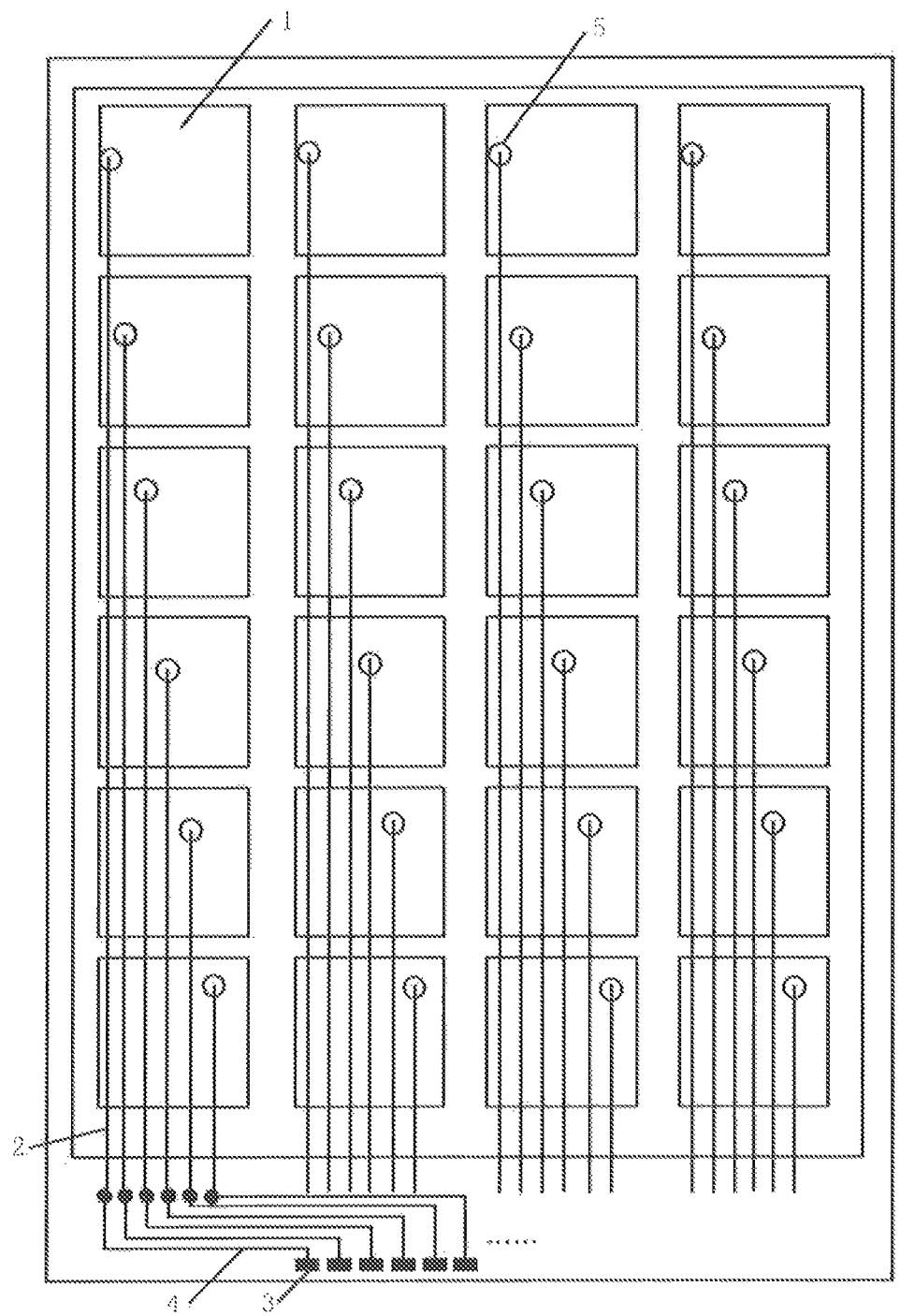
FIG. 1b is a top structural view of a capacitive touch structure in which wires and self-capacitance electrodes are disposed in different layers.

FIGS. 1a and 1b are top structural views of a capacitive touch structure in which wires and self-capacitance electrodes are disposed in the same layer and different layers respectively. In the self-capacitance touch structure, each self-capacitance electrode needs to be connected with the touch sensing chip via a separate lead-out wire, as shown in FIGS. 1a and 1b. Each lead-out wire may comprise, for example: a wire 2 for connecting the self-capacitance electrode 1 to the margin frame of the touch panel, and a periphery wiring 4 disposed at the margin frame for connecting the self-capacitance electrode 1 to connecting terminal 3 of the touch sensing chip. In FIG. 1a, the wires 2 and the self-capacitance electrodes 1 are disposed in the same layer; while in FIG. 1b, the self-capacitance electrodes 1 and the wires 2 are disposed in different layers, and self-capacitance electrodes 1 and corresponding wires 2 are electrically connected through via holes 5.

Generally, the number of self-capacitance electrodes would be very large. Considering an example in which each self-capacitance electrode occupies an area of 5 mm*5 mm, a 5 inch liquid crystal display would requires 264 self-capacitance electrodes. If each self-capacitance electrode is designed slightly smaller, there are more self-capacitance electrodes, which need many wires connected with self-capacitance electrodes, hence leading to some problems. For example, many wires would need many periphery wirings disposed at the margin frame and one-to-one connected with the wires, which is disadvantageous to the design for narrowing margin frame. When wires and self-capacitance electrodes are disposed in the same layer, many wires would lead to a large touch dead zone.

In summary, there are many self-capacitance electrodes in the current self-capacitance touch structure, which need also many wires connected with self-capacitance electrodes, hence leading to problems such as being adverse to the design of narrow margin fame and a large touch dead zone.

In at least one embodiment of the present invention, a capacitive touch structure applicable to a touch screen comprises: a plurality of self-capacitance electrodes disposed in the same layer and insulated from each other; a plurality of block electrodes disposed in the same layer as the self-capacitance electrodes and insulated from the self-capacitance electrodes, wherein at least many adjacent self-capacitance electrodes satisfy the following conditions: at least two block electrodes are provided between any two adjacent self-capacitance electrodes, and each of the at least two block electrodes corresponds to only one self-capacitance electrode; a plurality of first wires electrically connected with the self-capacitance electrodes while not intersecting each other, wherein the self-capacitance electrodes are each electrically connected with different first wires; a plurality of second wires electrically connected with the block electrodes while not intersecting each other, wherein block electrodes corresponding to one self-capacitance electrode are electrically connected with the same one second wire, block electrodes corresponding to adjacent self-capacitance electrodes are electrically connected with different second wires, and one of the second wires is electrically connected with block electrodes corresponding to at least two self-capacitance electrodes; a touch sensing chip electrically connected with the first wires and second wires and configured to determine touch positions by detecting capacitance value variations of the self-capacitance electrodes and block electrodes in a touch scanning interval.

Embodiments of the present invention are different from a known capacitive touch structure which only comprises a plurality of self-capacitance electrodes disposed in the same layer and insulated from each other and a plurality of wires which are each electrically connected with one self-capacitance electrode. In embodiments of the present invention, as for self-capacitance electrodes disposed adjacently, at least two block electrodes disposed in the same layer as the self-capacitance electrodes and insulated from the self-capacitance electrodes are added between any two adjacent self-capacitance electrodes. Since the block electrodes insulated from the self-capacitance electrodes occupy a large part of the area, given a touch screen of an equal size, the number of the self-capacitance electrodes can be decrease significantly, thereby significantly reducing the number of first wires connected with self-capacitance electrodes. Each of the at least two block electrodes added between any two adjacent self-capacitance electrodes corresponds to only one self-capacitance electrode. Since block electrodes corresponding to one self-capacitance electrode are electrically connected with the same one second wire, and one second wire is electrically connected with block electrodes corresponding to at least two self-capacitance electrodes, thereby allowing the number of added second wires connected with block electrodes not to be too large. Therefore, in summary, the number of wires in embodiments of the present invention is reduced such that it is possible to reduce the probability of the problems that are adverse to the design of narrow margin frame and result in a large touch dead zone to a certain extent.

In at least one embodiment of the present invention, the touch sensing chip can determine touch positions, avoid misjudgment and realize accurate sensing according to signal variation on the first wires electrically connected with self-capacitance electrodes, and signal variations on the second wires electrically connected with block electrodes.

Thicknesses and shapes of layers in the accompanying drawings do not reflect real scale, and only serve to illustrate contents of the present invention.

At least one embodiment of the present invention provides a capacitive touch structure applied to a touch panel, comprising:

a plurality of self-capacitance electrodes disposed in a same layer and insulated from each other;

a plurality of block electrodes disposed in the same layer as the self-capacitance electrodes and insulated from the self-capacitance electrodes, wherein at least adjacent self-capacitance electrodes satisfy the following conditions: at least two block electrodes are provided between any two adjacent self-capacitance electrodes and each of the at least two block electrodes corresponds to only one self-capacitance electrode;

a plurality of first wires electrically connected with the self-capacitance electrodes while not intersecting each other, wherein the self-capacitance electrodes are each electrically connected with different first wires;

a plurality of second wires electrically connected with the block electrodes while not intersecting each other, wherein block electrodes corresponding to one self-capacitance electrode are electrically connected with the same one second wire, block electrodes corresponding to adjacent self-capacitance electrodes are electrically connected with different second wires, and one of the second wires is electrically connected with block electrodes corresponding to at least two self-capacitance electrodes; and a touch sensing chip electrically connected with the first wires and the second wires and configured to determine touch position by detecting capacitance value changes of the self-capacitance electrodes and block electrodes in a touch scanning interval.

In implementations, the embodiments of the present invention are different from the known capacitive touch structure which only comprises a plurality of self-capacitance electrodes disposed in the same layer and insulated from each other and a plurality of wires that are each electrically connected with one self-capacitance electrode.

In embodiments of the present invention, as for self-capacitance electrodes disposed adjacently, at least two block electrodes disposed in the same layer as the self-capacitance electrodes and insulated from the self-capacitance electrodes are added between any two adjacent self-capacitance electrodes. Because the block electrodes insulated from the self-capacitance electrodes occupy a large part of the area, given a touch screen of an equal size, the number of the self-capacitance electrodes can be decreased significantly, thereby significantly reducing the number of the first wires connected with the self-capacitance electrodes. Each of the at least two block electrodes added between any two adjacent self-capacitance electrodes corresponds to only one self-capacitance electrode. Because block electrodes corresponding to one self-capacitance electrode are electrically connected with the same one second wire, and one of the second wires is electrically connected with the block electrodes corresponding to at least two self-capacitance electrodes, thereby allowing the number of added second wires connected with block electrodes not to be too large. Therefore, in summary, the number of wires in embodiments of the present invention is reduced such that it is possible to reduce the probability of encountering problems that are adverse to the design of narrow margin frame and result in a large touch dead zone to a certain extent and it is favorable to reducing costs of the touch sensing chip.

Furthermore, in embodiments of the present invention, the touch sensing chip can determine touch positions, avoid misjudgment and realize accurate sensing according to signal variation on the first wires electrically connected with self-capacitance electrodes, and signal variations on the second wires electrically connected with block electrodes.

Hereinafter, examples of self-capacitance electrodes, block electrodes, first wires and second wires in embodiments of the present invention will be briefly described.

1. Self-Capacitance Electrode

For example, the shape of self-capacitance electrodes may be of a regular shape or may be of an irregular shape.

For example, the shape of self-capacitance electrodes may be of any regular shape such as square, rectangle, triangle and circle. As shown in FIGS. 2a~2f, the self-capacitance electrode 10 is of a square shape.

For example, the shape of self-capacitance electrodes may be any irregular shape.

In at least one embodiment, when self-capacitance electrodes are of a regular shape, their manufacturing complexity degree is relatively low.

For example, the shapes of self-capacitance electrodes may be completely identical. For example, as shown in FIGS. 2a~2f, each of self-capacitance electrodes 10 comprised in the capacitive touch structure has the same shape.

For example, shapes of self-capacitance electrodes may be partially identical to or completely different from each other.

In at least one embodiment, when self-capacitance electrodes have a completely identical shape, their manufacturing complexity degree is relatively low.

In at least one embodiment of the present invention, opposite sides of adjacent two of self-capacitance electrodes are both fold lines.

For example, the opposite sides of adjacent two self-capacitance electrodes that are fold lines both have step-like structures that are consistent and matching each other; and/or the opposite sides of adjacent two self-capacitance electrodes that are fold lines both have concave-convex structures that are consistent and matching each other.

In at least one embodiment, configuration of the opposite sides of adjacent two self-capacitance electrodes as fold lines can ensure that, even when a little finger touches the screen, the touch position of human body may always cover the region for at least one self-capacitance electrodes, thereby improving accuracy of determining touch position.

2. Block Electrode

In embodiments of the present invention, the operation principle for block electrodes is similar to that for self-capacitance electrodes. When a human body does not touch the screen, each block electrode experiences capacitance of a fixed value. When the human body touches the screen, block electrodes corresponding to the touch position experience capacitance that is the fixed value plus the body capacitance. The touch sensing chip can determine possible touch positions by detecting capacitance value variation of block electrodes in the touch scanning period.

Similar to the implementation of self-capacitance electrodes, the shape of block electrodes may be of a regular shape or an irregular shape.

In at least one embodiment, when block electrodes are of a regular shape, their manufacturing complexity degree is relatively low.

Similar to the implementation of self-capacitance electrodes, shapes of block electrodes may be completely identical, partially identical to or completely different from each other.

In at least one embodiment, when block electrodes have completely identical shape, their manufacturing complexity degree is relatively low.

The relationship between the self-capacitance electrodes and block electrodes in at least one embodiment of the present invention satisfies the following condition. There are at least adjacent ones of the self-capacitance electrodes that satisfy the following conditions: at least two block electrodes are provided between any two adjacent self-capacitance electrodes, and each of the at least two block electrodes corresponds to only one self-capacitance electrode.

The adjacent self-capacitance electrodes in at least one embodiment of the present invention may be any one type of adjacent self-capacitance electrodes, for example, the self-capacitance electrodes disposed adjacently in at least one row and/or column, or the self-capacitance electrodes disposed adjacently in any one separate region.

Figure 2A:
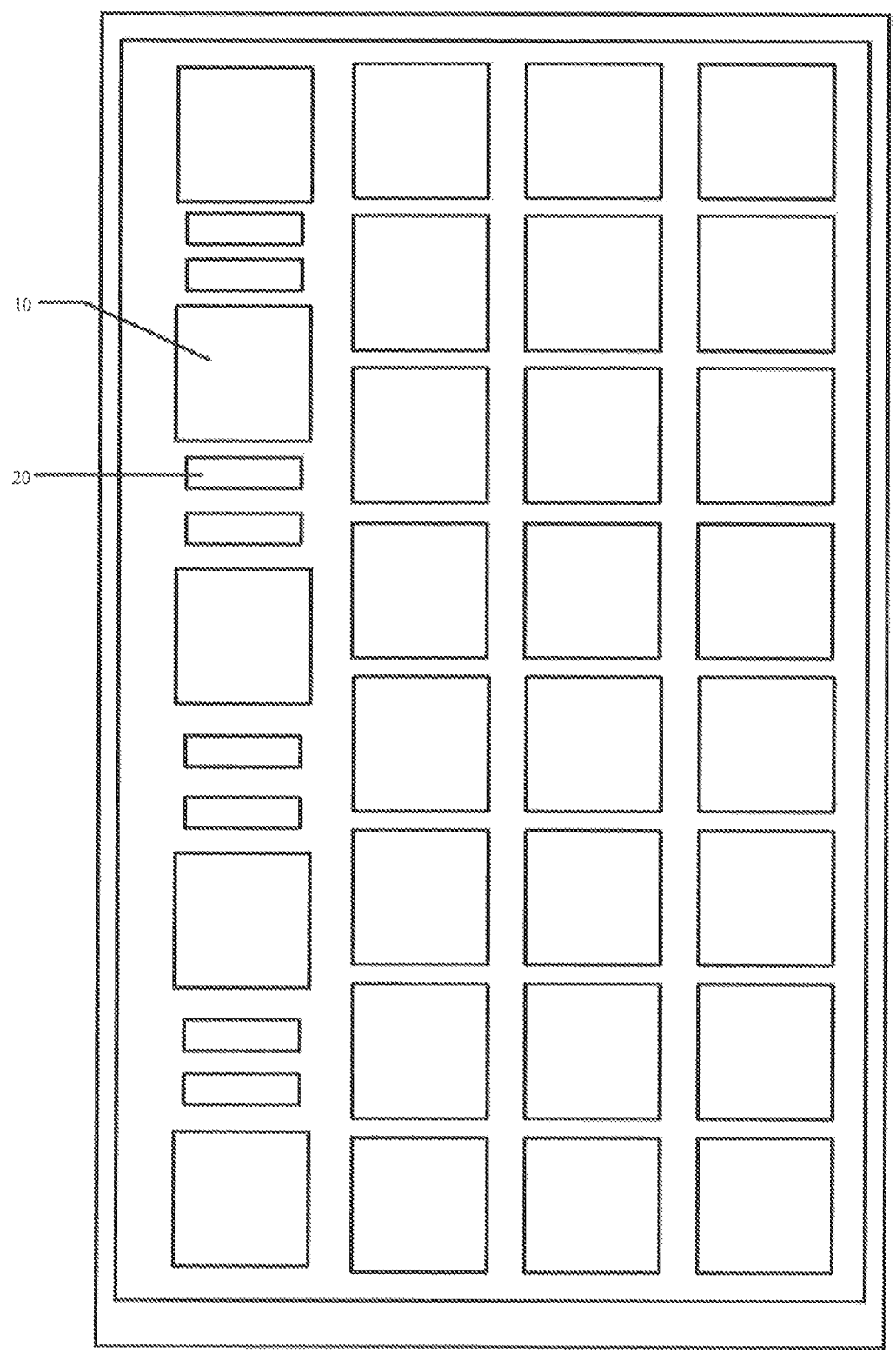
FIGS. 2a~2f are top structural views of a capacitive touch structure provided in an embodiment of the present invention.

For example, as shown in FIG. 2a, adjacent self-capacitance electrodes 10 in one column satisfy the following conditions: two block electrodes 20 are provided between any two adjacent self-capacitance electrodes 10, and each of the two block electrodes 20 corresponds to only one of the adjacent self-capacitance electrodes 10.

Figure 2B:
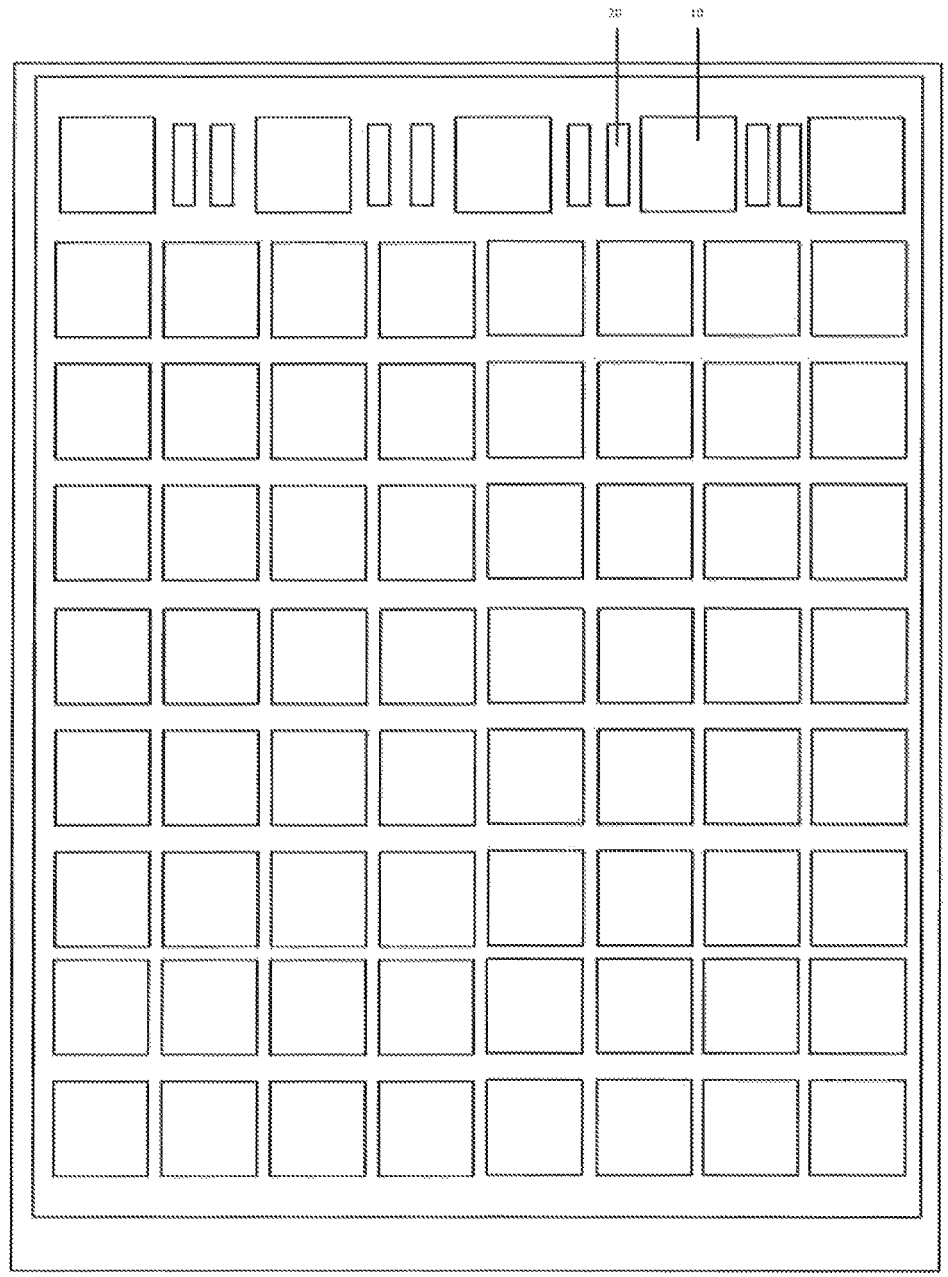

For example, as shown in FIG. 2b, adjacent self-capacitance electrodes 10 in a row satisfy the following conditions: two block electrodes 20 are provided between any two adjacent self-capacitance electrodes 10, and each of the two block electrodes 20 corresponds to only one of the adjacent self-capacitance electrodes 10.

Figure 2C:
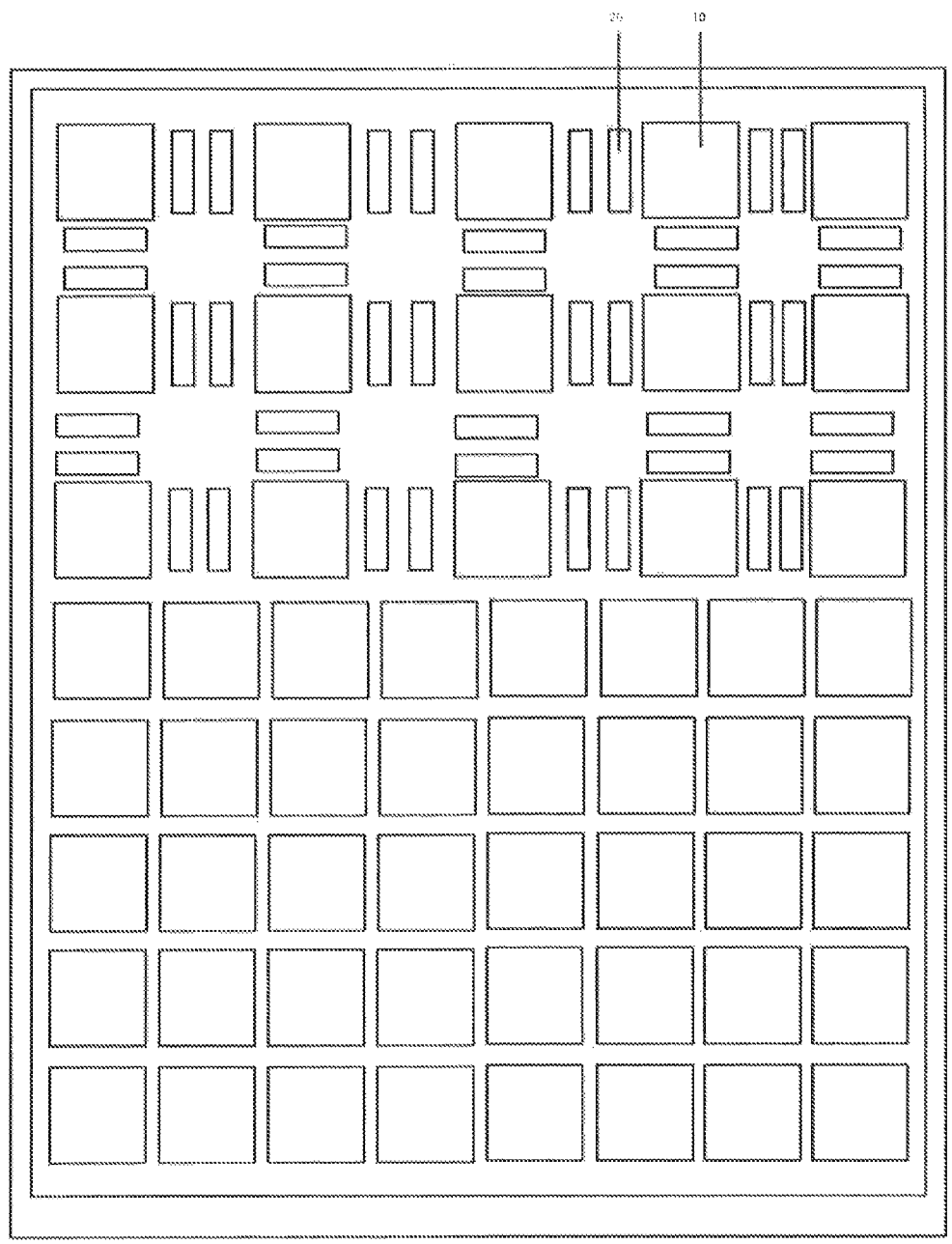

For example, as shown in FIG. 2c, adjacent self-capacitance electrodes 10 in a separate region satisfy the following conditions: two block electrodes 20 are provided between any two adjacent self-capacitance electrodes 10, and each of the two block electrodes 20 corresponds to only one of the adjacent self-capacitance electrodes 10.

In at least one embodiment, because the block electrodes corresponding to one self-capacitance electrode are electrically connected with the same one second wire, in order to avoid influence on touch sensing accuracy to a certain extent, the number of block electrodes provided between two adjacent self-capacitance electrodes should not be big.

In at least one embodiment of the present invention, there are at least adjacent ones of the self-capacitance electrodes that satisfy the following conditions: two block electrodes are provided between any two adjacent self-capacitance electrodes, and each of the two block electrodes corresponds to only one of the adjacent self-capacitance electrodes.

In at least one embodiment, each of the block electrodes may correspond to a same self-capacitance electrode or a different self-capacitance electrode.

In at least one embodiment of the present invention, the self-capacitance electrodes are arranged in a matrix. Two block electrodes are provided between any two adjacent self-capacitance electrodes. Each of the two block electrodes corresponds to one of the two adjacent self-capacitance electrodes and each of the block electrodes corresponds to a different self-capacitance electrode.

Figure 2D:
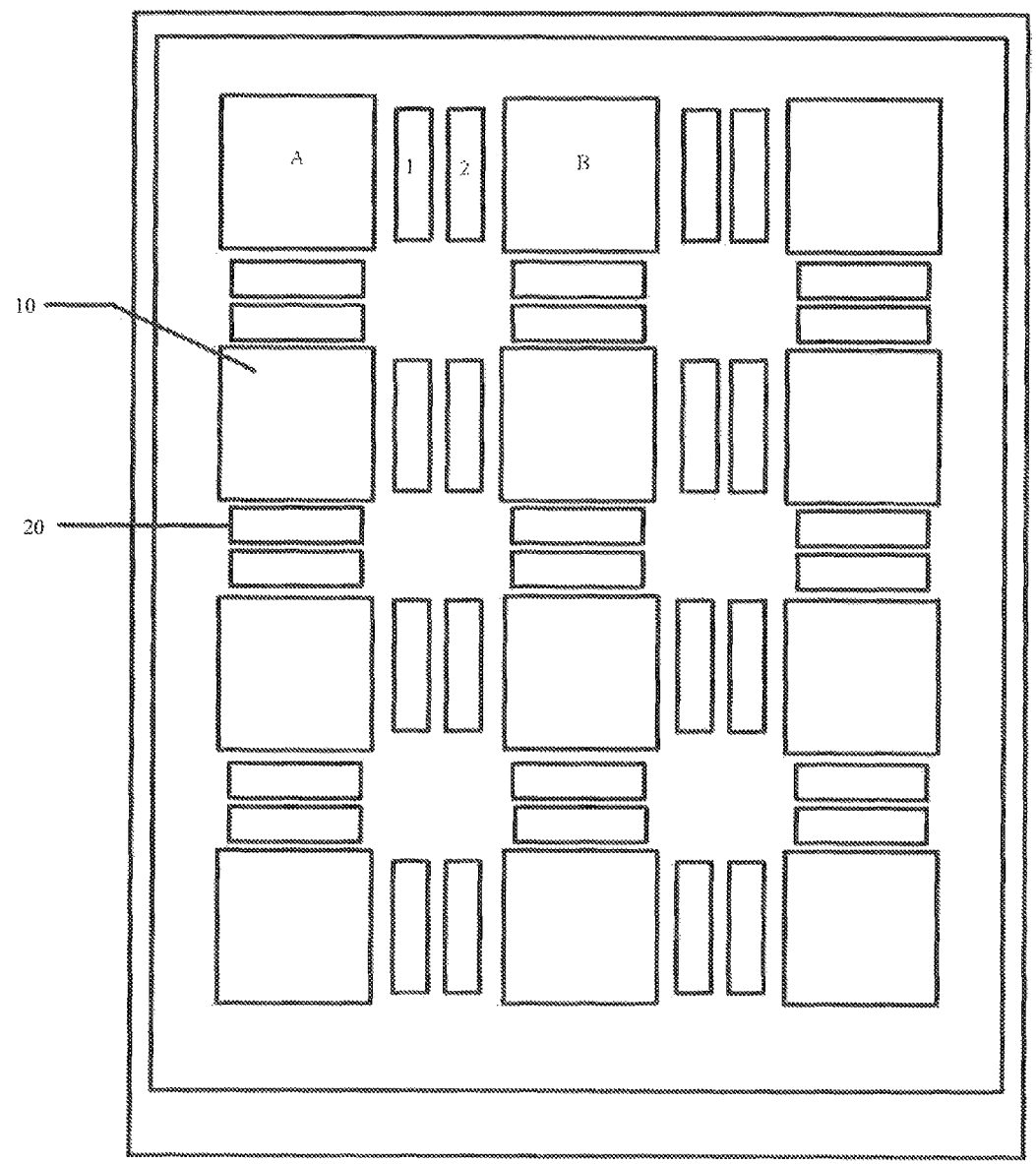

For example, as shown in FIG. 2d, the self-capacitance electrodes 10 are arranged in a matrix. Two block electrodes 20 are provided between any two adjacent self-capacitance electrodes 10, and each of the two block electrodes 20 corresponds to only one adjacent self-capacitance electrode 10. Considering a self-capacitance electrode A and a self-capacitance electrode B that are adjacent to each other as an example, a block electrode 1 and a block electrode 2 are provided for the self-capacitance electrode A and the self-capacitance electrode B. The block electrode 1 corresponds to the self-capacitance electrode A, and the block electrode 2 corresponds to the self-capacitance electrode B.

In one embodiment, reduction of the number of wires and the determination accuracy of touch positions are traded off. That is, it is both possible to reduce the number of wires significantly and guarantee the sensing accuracy.

In at least one embodiment of the present invention, each of the self-capacitance electrodes is provided with a block electrode corresponding to itself and provided around it.

In the embodiment, since each of the self-capacitance electrodes are provided with a block electrode corresponding to itself and disposed around it, it is possible to increase the area occupied by the block electrodes and allow further reduction of the number of the self-capacitance electrodes given a touch panel of an equal size, thereby further reducing the number of first wires connected with self-capacitance electrodes and the number of periphery wirings one-to-one connected with the wires, which is more favorable to the design of narrow margin frame.

In at least one embodiment of the present invention, block electrodes around each self-capacitance electrode may be insulated from each other, or form a closed region surrounding the self-capacitance electrode.

Figure 2E:
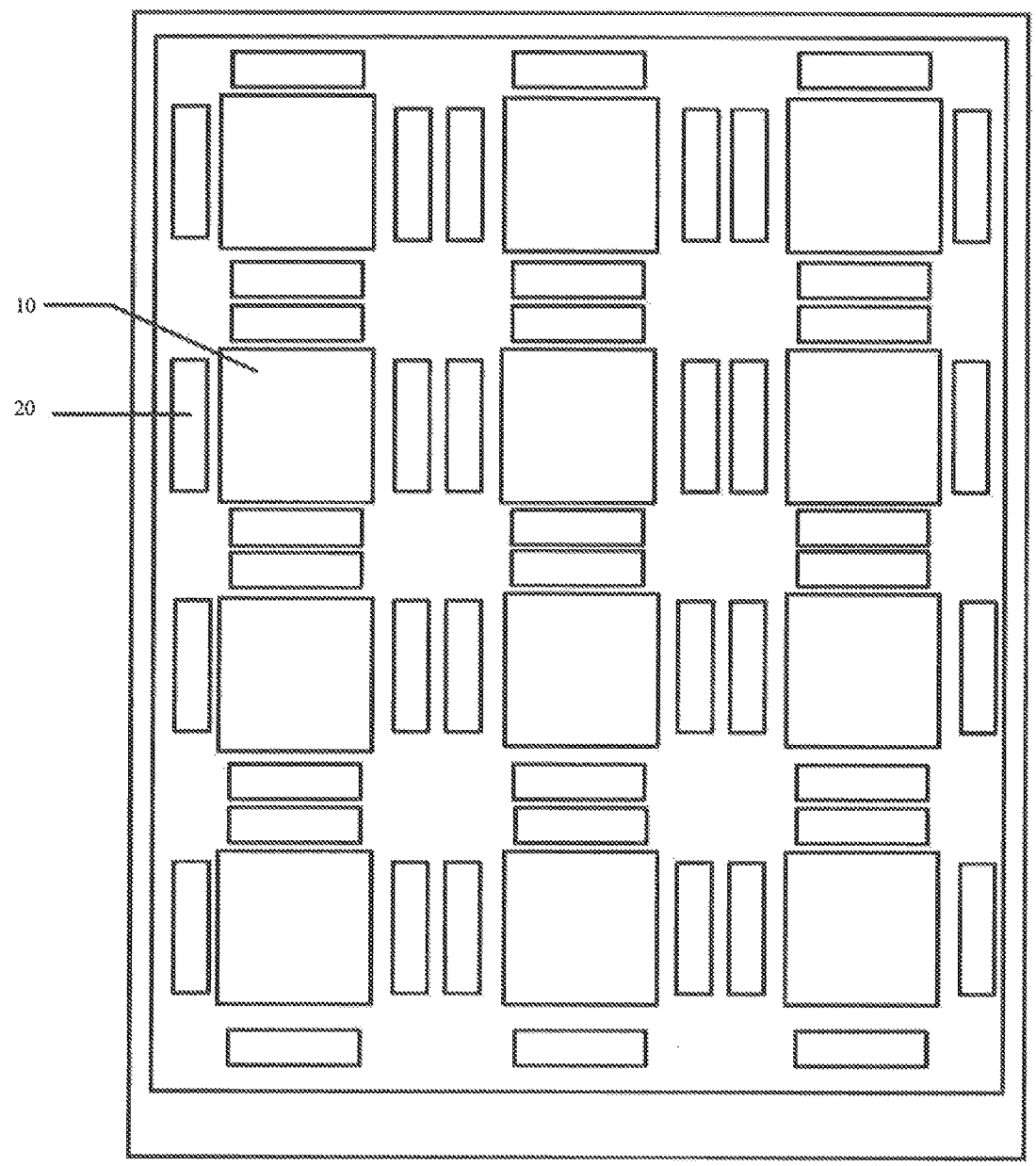
Figure 2F:
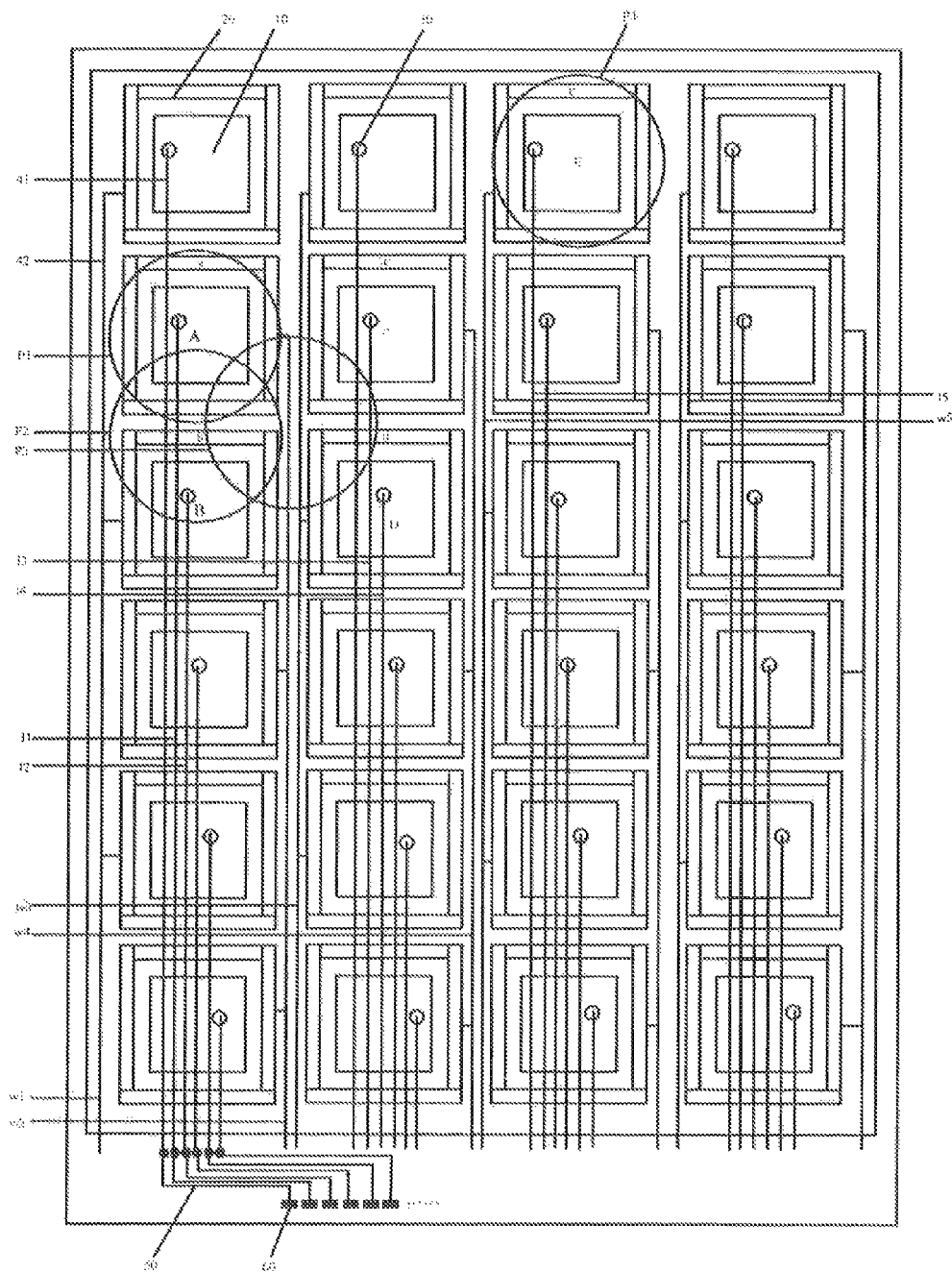

For example, as shown in FIG. 2e, block electrodes 20 around each of the self-capacitance electrodes 10 are insulated from each other. As shown in FIG. 2f, block electrodes 20 around each self-capacitance electrode 10 form a closed region surrounding the self-capacitance electrode 10.

In one embodiment, since block electrodes around each self-capacitance electrode form a closed region surrounding the self-capacitance electrode, it is possible to reduce the complexity of connecting block electrodes as well as second wires, thereby reducing the complexity of the capacitive touch structure.

3. First Wires

It is possible to form the first wires and the self-capacitance electrodes in the same layer or different layers.

In at least one embodiment of the present invention, the first wires and the self-capacitance electrodes are disposed in different layers, and self-capacitance electrodes are electrically connected with corresponding first wires disposed in a different layer through via holes.

For example, as shown in FIG. 2f, self-capacitance electrodes 10 are electrically connected with corresponding first wires 41 disposed in a different layer through via holes 30.

In at least one embodiment of the present invention, by disposing self-capacitance electrodes and first wires in different layers, the touch dead zone in the touch panel may be reduced.

In at least one embodiment of the present invention, in the case where block electrodes around each self-capacitance electrode form a closed region surrounding the self-capacitance electrode, disposing self-capacitance electrodes and first wires in different layers can avoid short circuit between self-capacitance electrodes and block electrodes.

In at least one embodiment of the present invention, one self-capacitance electrode may be electrically connected with at least one of the first wires.

In at least one embodiment of the present invention, one self-capacitance electrode is electrically connected with one of the first wires.

In at least one embodiment of the present invention, with one self-capacitance electrode being electrically connected one of the first wires, the number of first wires may be further reduced.

4. Second Wires

The second wires in embodiments of the present invention should satisfy the following conditions: block electrodes corresponding to one self-capacitance electrode are electrically connected with the same one second wire, block electrodes corresponding to adjacent self-capacitance electrodes are electrically connected with different second wires, and one second wire is electrically connected with block electrodes corresponding to at least two self-capacitance electrodes.

In at least one embodiment of the present invention, block electrodes around each self-capacitance electrode form a closed region surrounding the self-capacitance electrode; each column of the block electrodes is connected with at least two of the second wires, wherein each of the second wires is connected with at least two every other block electrodes (not adjacent to each other); or each row of the block electrodes are connected with at least two of the second wires, wherein each of the second wires is connected with at least two every other block electrodes.

In at least one embodiment of the present invention, each of the second wires is connected with at least two every other block electrodes to guarantee to a certain extent that the number of second wires connected with block electrodes is small, so as to reduce the number of periphery wirings one-to-one connected with wires and facilitate narrow margin frame design.

In at least one embodiment of the present invention, block electrodes around each self-capacitance electrode form a closed region surrounding the self-capacitance electrode; each column of the block electrodes are connected with two of the second wires, wherein one of the second wires is connected with the odd numbered rows of the block electrodes and the other of the second wires is connected with the even numbered rows of the block electrodes; or each row of the block electrodes are connected with two of the second wires, wherein one of the second wires is connected with the odd numbered columns of the block electrodes, and the other of the second wires is connected with even numbered columns of the block electrodes.

In at least one embodiment of the present invention, with each column of the block electrodes being connected with two of the second wires or each row of the block electrodes being connected with two of the second wires, the number of second wires may be further reduced, which is more favorable to the narrow margin frame design.

For example, it is possible to dispose the second wires and the block electrodes in the same layer or different layers as required.

In at least one embodiment of the present invention, block electrodes around each self-capacitance electrode form a closed region surrounding the self-capacitance electrode and the second wires and the block electrodes are disposed in the same layer; each column of the block electrodes are connected with two of the second wires, wherein one of the second wires is connected with the odd numbered rows of the block electrodes and the other of the second wires is connected with the even numbered rows of the block electrodes; or each row of the block electrodes are connected with two of the second wires, wherein one of the second wires is connected with the odd numbered columns of the block electrodes, and the other of the second wires is connected with the even numbered columns of the block electrodes.

For example, as shown in FIG. 2f, block electrodes 20 around each self-capacitance electrode 10 form a closed region surrounding the self-capacitance electrode 10, and the second wires 42 and the block electrodes 20 are disposed in the same layer; each column of the block electrodes 20 are electrically connected with two of the second wires 42, wherein one of the second wires 42 is electrically connected with the odd numbered rows of the block electrodes directly, and the other of the second wires 42 is electrically connected with the even numbered rows of the block electrodes directly.

In at least one embodiment of the present invention, with each column of the block electrodes being connected with two of the second wires or each row of the block electrodes being connected with two of the second wires, the number of second wires disposed in the same layer as the block electrodes may be reduced, thereby reducing the touch dead zone.

In at least one embodiment of the present invention, the second wires and the block electrodes are disposed in different layers, and block electrodes and corresponding second wires disposed in different layer are electrically connected through via holes.

In at least one embodiment of the present invention, disposing of block electrodes and second wires in different layers may reduce touch dead zone in the touch panel.

In at least one embodiment of the present invention, self-capacitance electrodes and block electrodes are disposed in the same layer, self-capacitance electrodes and first wires are disposed in different layers, and block electrodes and second wires are disposed in different layers, touch dead zone in a touch panel can be thoroughly eliminated.

In at least one embodiment of the present invention, the self-capacitance electrodes and first wires are disposed in different layers, the block electrodes and the second wires are disposed in different layers; the first wires and second wires may be disposed in the same layer or different layers.

For example, the first wires and second wires are disposed in the same layer and do not intersect with each other.

In at least one embodiment of the present invention, disposing of the first wires and second wires in the same layer may reduce the number of layers.

In at least one embodiment of the present invention, the first wires and the second wires not intersecting each other can avoid short circuit between self-capacitance electrodes and block electrodes.

In at least one embodiment of the present invention, the first wires and second wires may be electrically connected with the touch sensing chip directly, or via periphery wirings.

For example, the first wires connect the self-capacitance electrodes to the margin frame of the touch panel; and the second wires connect the block electrodes to the margin frame of the touch panel. Then, the touch panel may further comprise periphery wirings at the margin frame of the touch panel which are electrically connected with the first wires and the second wires; and the touch sensing chip is electrically connected with the periphery wirings via connection terminals.

In at least one embodiment of the present invention, due to the reduced number of wires, the number of periphery wirings connected with wires is also reduced, which will facilitate design of narrow margin frame of the touch panel.

In at least one embodiment of the present invention, each of the self-capacitance electrodes is provided with block electrodes corresponding to itself and disposed around it, and block electrodes around each self-capacitance electrode form a closed region surrounding the self-capacitance electrode. Each column of the block electrodes are connected with at least two of the second wires. For example, the margin frame of the touch panel is of a rectangle shape, and the extension directions of the first wires and the second wires are consistent with a direction of a short side of the margin frame.

In at least one embodiment of the present invention, the first wires and the second wires extend in the same direction and are parallel to each other to guarantee easy realization of first wires not intersecting each other, second wires not intersecting each other, and first wires and second wires not intersecting each other.

For example, the margin frame of the touch panel is of a rectangle shape, and the extension directions of the first wires and the second wires may also be consistent with the direction of the long side of the margin frame.

Implementations of capacitive touch structure in embodiments of the present invention will be described in detail below with reference to FIG. 2f.

Embodiment 1

Implementations of capacitive touch structure in embodiment 1 of the present invention will be described in detail below with reference to FIG. 2f.

As shown in FIG. 2f, the capacitive touch structure applied to a touch panel comprises: self-capacitance electrodes 10, block electrodes 20, first wires 41, second wires 42, periphery wirings 50, and a touch sensing chip.

A plurality of self-capacitance electrodes 10 are disposed in a matrix in the same layer and insulated from each other. FIG. 2f is explained with respect to an example in which there are 6 rows by 4 columns of totally 24 self-capacitance electrodes 10.

The block electrodes 20 and the self-capacitance electrodes 10 are disposed in the same layer and insulated from the self-capacitance electrodes 10. Block electrodes 20 around each self-capacitance electrode 10 form a closed region surrounding the self-capacitance electrode 10. FIG. 2f is explained with respect to an example in which there are 6 rows by 4 columns of totally 24 block electrodes 20.

The first wires 41 parallel to each other are disposed in different layer from the self-capacitance electrodes 10 and connect the self-capacitance electrodes 10 to the margin frame of the touch panel. One first wire 41 is electrically connected with a corresponding self-capacitance electrode 10 through a via hole 30.

The second wires 42 not intersecting each other are disposed in the same layer as the block electrodes 20 and connect the block electrodes 20 to the margin frame of the touch panel. Each column of the block electrodes 20 are electrically connected with two of the second wires 42, wherein one of the second wires 42 is electrically connected with the odd numbered rows of the block electrodes directly, and the other of the second wires 42 is electrically connected with the even numbered rows of the block electrodes directly.

Periphery wirings 50 are located at the margin frame of the touch panel and one-to-one connected with the first wires 41 and the second wires 42.

A touch sensing chip is electrically connected with the periphery wirings 50 via the connection terminals 60 and configured to determine touch position by detecting capacitance value changes of the self-capacitance electrodes 10 and the block electrodes 20 in the touch scanning interval.

Figure 3:
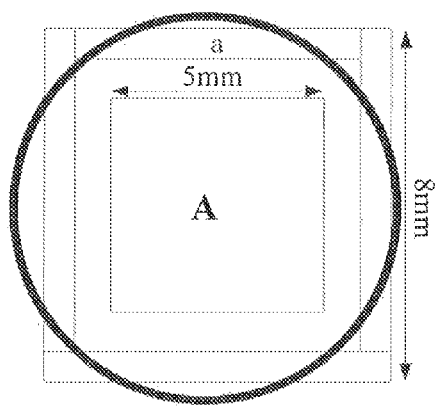
FIG. 3 is a partial enlarged drawing at point P1 shown in FIG. 2f in an embodiment of the present invention.

Taking the size of touch panel shown in FIG. 2f as an example, as shown in FIG. 3, it is assumed that each self-capacitance electrode 10 of a square shape has a side length of 5 mm, and each of the block electrodes 20 that form the closed region surrounding the self-capacitance electrode 10 has an equal side length of 8 mm.

If a currently known configuration is adopted, in which a capacitive touch structure comprises a plurality of self-capacitance electrodes disposed in the same layer and insulated from each other and wires are electrically connected with different ones of self-capacitance electrodes, 9 rows by 6 columns of totally 54 block electrodes 20 are needed, and accordingly, 54 wires are needed.

If the configuration described in respective embodiments of the present invention, 24 first wires 41 electrically connected with self-capacitance electrodes 10 are needed, and 2*4=8 second wires 42 electrically connected with block electrodes 20 are needed; therefore, totally 32 wires are needed.

Therefore, in summary, the number of wires in the embodiment of the present invention is reduced, which allows a reduced number of periphery wirings one-to-one connected with wires. This is advantageous for the design of narrow margin frame of touch panel and for reducing costs of touch sensing chips.

Embodiment 2

The touch principle of the capacitive touch structure applied in the touch panel in embodiment 2 of the present invention will be described in detail below with reference to FIG. 2f.

I. Single-Point Touch

Touch Point P1

As shown in FIG. 2f, the touch point P1 partially overlaps with both a self-capacitance electrode A and a block electrode a. When a finger touches the position of the point P1 as shown in FIG. 2f, signals on a first wire l1 and a second wire w2 electrically connected with the self-capacitance electrode A and the block electrode a respectively will change. The touch sensing chip determines that the touch position is the position of point P1 according to the signal variation on first wire l1 electrically connected with the self-capacitance electrode A and signal variation on the second wire w2 electrically connected with block electrode a.

Touch Point P2

As shown in FIG. 2f, the touch point P2 partially overlaps with a self-capacitance electrode A, a self-capacitance electrode B, and a block electrode b. When a finger touches the position of the point P2 as shown in FIG. 2f, signals on a first wire l1, a first wire l2 and a second wire w2 electrically connected with the self-capacitance electrode A, the self-capacitance electrode B and the block electrode b respectively will change. The touch sensing chip determines that the touch position is the position of the point P2 according to signal variations on the first wire l1, the first wire l2, the second wire w2 and the second wire w1 electrically connected with the self-capacitance electrode A, the self-capacitance electrode B, the block electrode a and the block electrode b, respectively.

Touch Point P3

As shown in FIG. 2f, the touch point P3 partially overlaps all a self-capacitance electrode A, a self-capacitance electrode B, a self-capacitance electrode C, a self-capacitance electrode D, a block electrode a, a block electrode b, a block electrode c and a block electrode d.

When a finger touches the position of point P3 as shown in FIG. 2f, signals on a first wire l1, a first wire l2, a first wire l3, a first wire l4, a second wire w2, a second wire w1, a second wire w4 and a second wire w3 electrically connected with the self-capacitance electrode A, the self-capacitance electrode B, the self-capacitance electrode C, the self-capacitance electrode D, the block electrode a, the block electrode b, the block electrode c and the block electrode d respectively will all change.

The touch sensing chip determines that the touch position is the position of point P3 according to signal variations on the first wire l1, the first wire l2, the first wire l3, the first wire l4, the second wire w2, the second wire w1, the second wire w4 and the second wire w3 electrically connected with the self-capacitance electrode A, the self-capacitance electrode B, the self-capacitance electrode C, the self-capacitance electrode D, the block electrode a, the block electrode b, the block electrode c and the block electrode d respectively and weak signal vacations on the first wire l1, the first wire l2, the first wire l3 and the first wire l4 electrically connected with the self-capacitance electrode A, the self-capacitance electrode B, the self-capacitance electrode C and the self-capacitance electrode D, respectively.

II. Multipoint Touch

Touch Points P1 and P4 as Shown in FIG. 2f

In order to facilitate understanding the solutions in embodiments of the present invention, it is assumed first that, when one position is touched, the total amount of signal variation on the wires connected with electrodes corresponding to the position is one unit amount.

When a finger touches the position of the point P1, signals on the first wire l1 and the second wire w2 electrically connected with the self-capacitance electrode A and the block electrode a respectively will both change. According to the principle that the larger area point P1 overlaps, the larger signal variation on wires electrically connected therewith, it is determined that the signal variation amount on the first wire l1 is 0.6, and the signal variation amount on the second wire w2 is 0.4.

When a finger touches the position of the point P4, signals on the first wire l5 and the second wire w5 electrically connected with the self-capacitance electrode E and the block electrode e respectively will both change. According to the principle that the larger area the point P4 overlaps, the larger signal variation on the wires electrically connected therewith, it is determined that signal variation amount on the first wire l5 is 0.6, and signal variation amount on the second wire w5 is 0.4.

It is determined there are two touch points according to the fact that the total amount of signal variation on wires is two units.

It is determined the touch position of one touch point is the position of the point P1 according to the positional relationship between the self-capacitance electrode A and the block electrode a connected with the first wire l1 and the second wire w2 having signal variations respectively (the two are adjacent to each other here), and according to specific magnitudes of signal variation on each wire having signal variation (here, 0.6 for first wire l1, and 0.4 for second wire w2).

It is determined the touch position of one touch point is the position of the point P4 according to the positional relationship between the self-capacitance electrode E and the block electrode e connected with the first wire l5 and the second wire w5 having signal variations respectively (the two are adjacent to each other here), and according to specific magnitudes of signal variation on each wire having signal variation (here, 0.6 for first wire l5, and 0.4 for second wire w5).

Touch Points P2 and P4 as Shown in FIG. 2f

In order to facilitate understanding solutions in embodiments of the present invention, it is assumed first that, when one position is touched, the total amount of signal variation on the wires connected with electrodes corresponding to the position is one unit amount.

When a finger touches the position of the point P2, signals on the first wire l1, the first wire l2, the second wire w2 and the second wire w1 electrically connected with the self-capacitance electrode A, the self-capacitance electrode B, the block electrode a and the block electrode b respectively will all change. According to the principle that the larger area the point P1 overlaps, the larger signal variation on the wires electrically connected therewith, it is determined that the signal variation amount on the first wire l1 is 0.1, the signal variation amount on the first wire l2 is 0.4, the signal variation amount on second wire w2 is 0.2, and the signal variation amount on the second wire w1 is 0.3.

When a finger touches the position of the point P4, signals on the first wire l5 and the second wire w5 electrically connected with the self-capacitance electrode E and the block electrode e respectively will both change. According to the principle that the larger area the point P4 overlaps, the larger signal variation on the wires electrically connected therewith, it is determined that the signal variation amount on the first wire l5 is 0.6, and the signal variation amount on the second wire w5 is 0.4.

It is determined there are two touch points according to the fact that the total amount of signal variation on wires is two units.

It is determined the touch position of one touch point is the position of the point P2 according to the positional relationship among the self-capacitance electrode A, the self-capacitance electrode B, the block electrode a and the block electrode b connected with the first wire l1, the first wire l2, the second wire w2 and the second wire w1 having signal variations respectively (they are adjacent to each other here), and according to specific magnitudes of signal variation on each wire having signal variation (here, 0.1 for the first wire l1, 0.4 for the first wire l2, 0.2 for the second wire w2, and 0.3 for the second wire w1).

It is determined the touch position of one touch point is the position of the point P4 according to the positional relationship between the self-capacitance electrode E and the block electrode e connected with the first wire l5 and the second wire w5 having signal variations respectively (the two are adjacent to each other here), and according to specific magnitudes of signal variation on each wire having signal variation (here, 0.6 for the first wire l5, and 0.4 for the second wire w5).

Touch Points P3 and P4 as Shown in FIG. 2f

The implementation of determining touch position as positions of the points P3 and P4 is similar to the implementations of determining touch positions as positions of the points P1 and P4, or determining touch positions as positions of the points P2 and P4, and will not be described any more herein.

The capacitive touch structure described in at least one embodiment of the present invention may be applied to any type of current touch panels such as add-on mode touch panels, on-cell touch panels, and in-cell touch panels.

At least one embodiment of the present invention provides an in-cell touch panel comprising a top substrate and a bottom substrate disposed oppositely, and further comprising the capacitive touch structure described in embodiments of the present invention, wherein the self-capacitance electrodes, block electrodes, first wires and second wires are disposed on a side of the top substrate, which side faces the bottom substrate, or a side of the bottom substrate, which side faces the top substrate.

The in-cell touch panel according to embodiments of the present invention comprises the capacitive touch structure as described in embodiments of the present invention. Since the number of wires in the capacitive touch structure described in embodiments of the present invention is reduced, it allows the number of wires in the in-cell touch panel comprising the capacitive touch structure provided in embodiments of the present invention to be reduced as well, and is favorable to the narrow margin frame design of the in-cell touch panel, reducing the touch dead zone in the in-cell touch panel and reducing costs of the in-cell touch panel.

For example, periphery wirings at the margin frame are generally disposed on the bottom substrate.

For example, if the self-capacitance electrodes, the block electrodes, the first wires and the second wires are disposed on the top substrate, the first wires and the second wires will be electrically connected with the periphery wirings on the bottom substrate by means of the conducting function of gold balls in sealant. If the self-capacitance electrodes, the block electrodes, the first wires and the second wires are disposed on the bottom substrate, the first wires and the second wires are directly electrically connected with the periphery wirings on the bottom substrate.

For example, a touch sensing chip electrically connected with the periphery wirings via connection terminals are disposed on a circuit board, specifically, on a circuit board located at the back of the display device, or a circuit board located at the margin frame region of the display device, or on a flexible circuit board contained in the bottom substrate.

For example, the in-cell touch panel provided in embodiments of the present invention further comprises: a black matrix layer disposed on a side of the top substrate, which side faces the bottom substrate, or a side of the bottom substrate, which side faces the top substrate; the orthogonal projections of the self-capacitance electrodes, the block electrodes, the first wires, and the second wires on the bottom substrate are within the orthogonal projection of the black matrix layer on the bottom substrate.

In at least one embodiment of the present invention, since the orthogonal projections of the self-capacitance electrodes, the block electrodes, the first wires and the second wires on the bottom substrate are within the orthogonal projection of the black matrix layer on the bottom substrate, the electric fields generated by the self-capacitance electrodes and the block electrodes will not influence the electric field in pixel opening regions and thus will not influence normal display.

In at least one embodiment of the present invention, since the orthogonal projections of the self-capacitance electrodes, the block electrodes, the first wires and the second wires on the bottom substrate are within the orthogonal projection of the black matrix layer on the bottom substrate, it is also possible to avoid influence on transmittance of the touch panel.

In at least one embodiment of the present invention, a pattern of orthogonal projections of the self-capacitance electrodes and the block electrodes on the bottom substrate is of a mesh structure within the orthogonal projection of the black matrix layer on the bottom substrate.

In at least one embodiment of the present invention, the resolution of a touch panel is generally on the order of millimeters while the resolution of a display screen is generally on the order of microns. Therefore, one self-capacitance electrode or one block electrode generally corresponds to a plurality of pixel units in a display screen. In order to guarantee that self-capacitance electrodes and the block electrodes do not occupy opening regions of pixel units, it is possible to cut out portions, corresponding to opening regions of pixel units, of the self-capacitance electrodes and the block electrodes. The resolution as referred to in embodiments of the present invention means the pitch between self-capacitance electrodes of the touch panel or the pitch between pixel units of the display screen.

Figure 5:
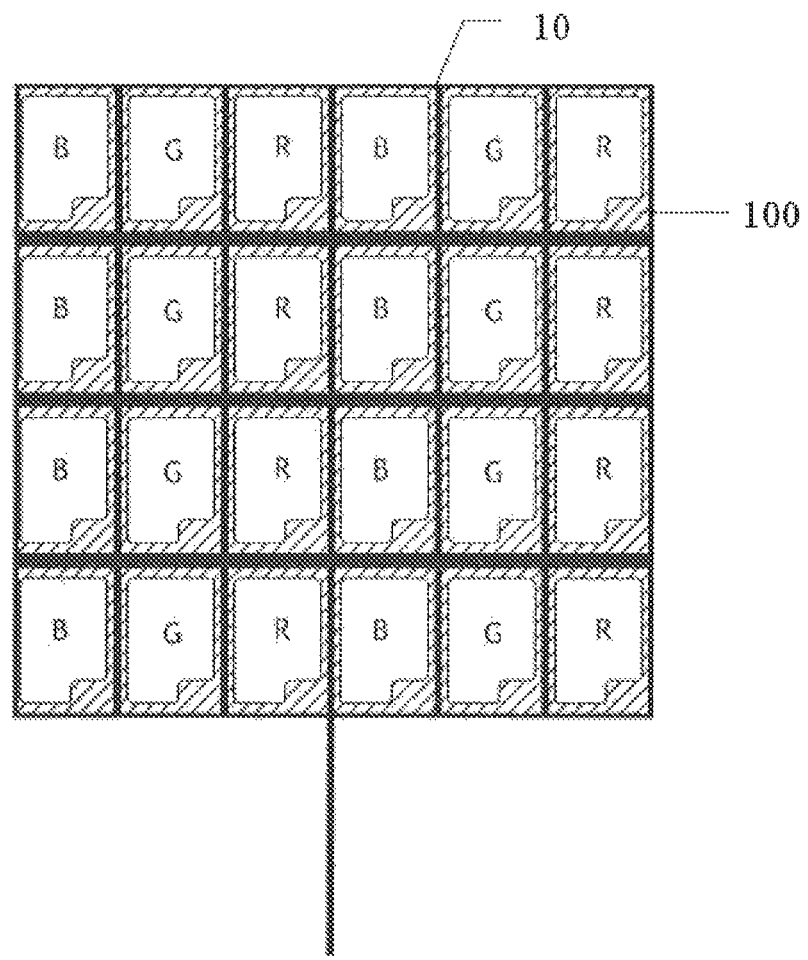
FIG. 5 is a structural view of one self-capacitance electrode in the capacitive touch structure provided in an embodiment of the present invention.

For example, referring to an example in which the pattern of orthogonal projection of the self-capacitance electrodes on the bottom substrate is of a mesh structure within the orthogonal projection of the black matrix layer on the bottom substrate, as shown in FIG. 5, portions of self-capacitance electrodes 10 that correspond to the opening regions of pixel units are cut out, that is, it is possible to design the pattern of self-capacitance electrodes 10 such that orthogonal projection on the bottom substrate is of a mesh structure within the orthogonal projection of black matrix layer 100 on the bottom substrate. Furthermore, in order to ensure display uniformity, self-capacitance electrodes 10 are generally provided in gaps of each sub-pixel unit within pixel units, and each set of RGB sub-pixel units constitute one pixel unit.

In at least one embodiment of the present invention, when the self-capacitance electrodes, the block electrodes, the first wires and the second wires are disposed on a side of the top substrate, which faces the bottom substrate, it is possible to dispose the self-capacitance electrodes, the block electrodes, the first wires and the second wires at any positions on the side of the top substrate, which side faces the bottom substrate.

For example, a black matrix layer, a color filter layer, a planarization layer and a spacer layer are stacked in order on the side of the top substrate, which side faces the bottom substrate. The self-capacitance electrodes, the block electrodes and the second wires are located between the black matrix layer and the color filter layer, and the first wires and the second wires are located on the color filter layer. Alternatively, the self-capacitance electrodes, the block electrodes and the second wires are located between the color filter layer and planarization layer, and the first wires are located on the planarization layer. Alternatively, the self-capacitance electrodes, the block electrodes and the second wires are located between the planarization layer and the spacer layer, and the first wires are located between the top substrate and the planarization layer.

Hereinafter, with reference to an example in which the self-capacitance electrodes, the block electrodes and the second wires in the same layer and between the black matrix layer and the color filter layer, and the first wires are located on the color filter layer, implementations of the in-cell touch panel described in embodiments of the present invention will be described in detail.

Figure 4:
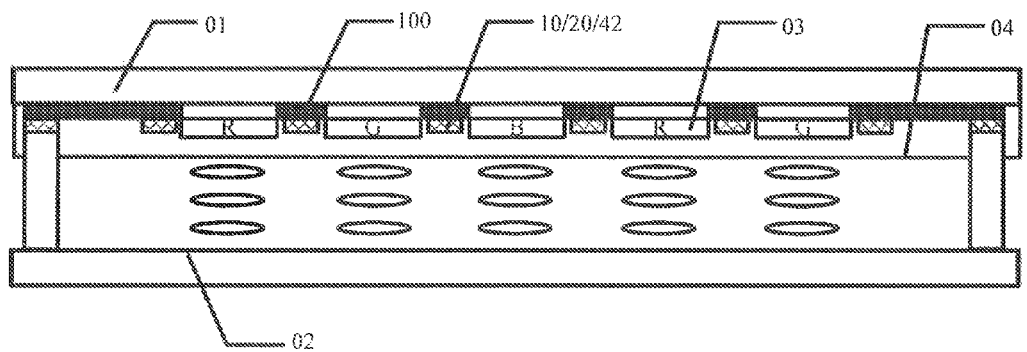
FIG. 4 is a top structural view of an in-cell touch panel in an embodiment of the present invention.
Figure 6:
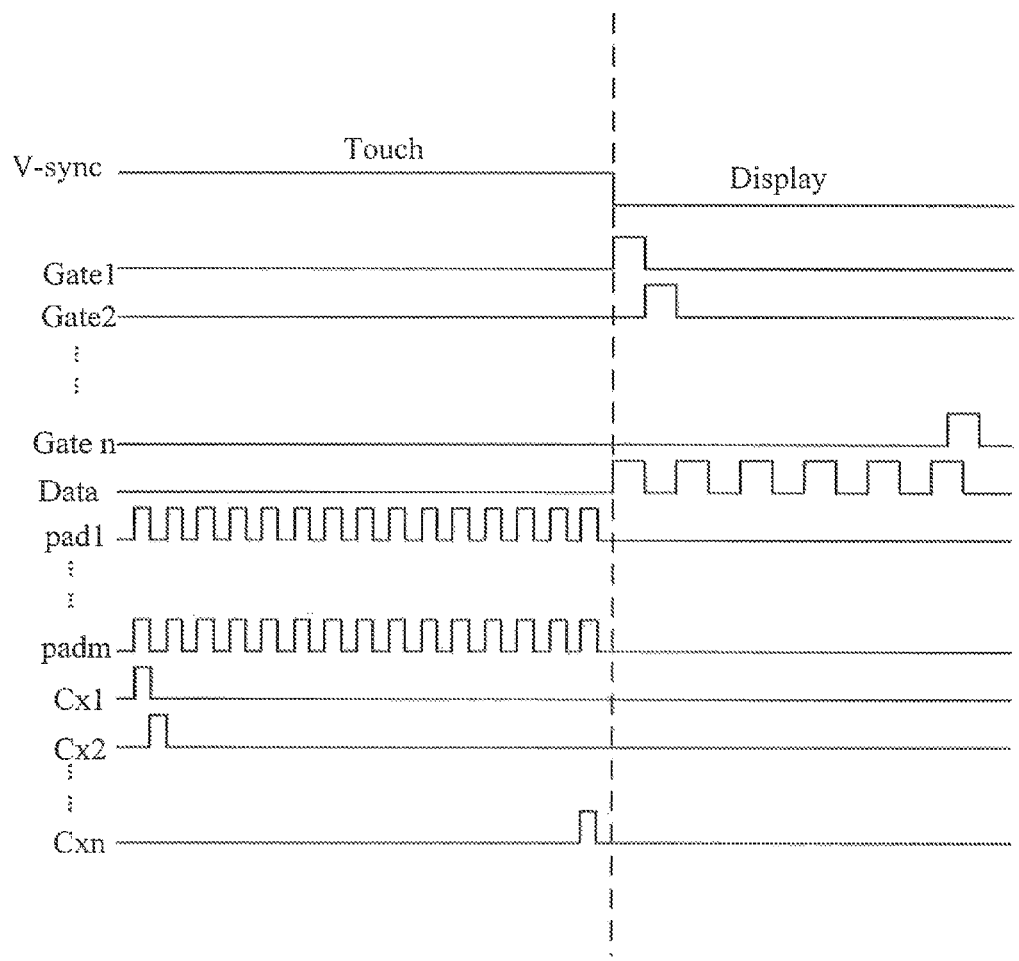
FIG. 6 is a driving time sequence diagram for a display device in an embodiment of the present invention.

As shown in FIG. 4, the in-cell touch panel described in at least one embodiment of the present invention comprises: a top substrate 01 and a bottom substrate 02 disposed oppositely to each other; a black matrix layer 100 disposed on a side of the top substrate 01, which side faces the bottom substrate 02; a layer on which self-capacitance electrodes 10, block electrodes 20 and second wires 42 are located on a side of the black matrix layer substrate, which side faces the bottom substrate 02; a color filter layer 03 located on a side of the layer on which self-capacitance electrodes 10, block electrodes 20 and second wires 42 are located and that faces the bottom substrate 02; and a layer on which first wires are located on a side of the color filter layer 03, which side faces the bottom substrate 02 (not shown in FIG. 6).

It further comprises a planarization layer 04 on a side of the layer on which the first wires are located, which side faces the bottom substrate 02; and a touch sensing chip 30 located on the bottom substrate. The first wires are connected with corresponding self-capacitance electrodes 10 through via holes in the color filter layer (not shown in FIG. 6); and the touch sensing chip 30 is not limited to be disposed on the bottom substrate 02.

In at least one embodiment, the layer on which self-capacitance electrodes, block electrodes and second wires are located is provided between the black matrix layer and the color filter layer, and the layer on which first wires are located is provided on a side of the color filter layer that faces the bottom substrate, this configuration can reduce interference of body capacitance with signals transmitted on first wires and second wires.

It is to be noted that, the above description involving the implementation of disposing the self-capacitance electrodes, the block electrodes, the first wires and the second wires on a side of the top substrate that faces the bottom substrate is conducted with reference to an example in which the first wires and the self-capacitance electrodes are disposed in different layers and the second wires and the block electrodes are disposed in the same layer. When the implementation of the layer where the self-capacitance electrodes, the block electrodes, the first wires and the second wires are located is conducted in another way, the implementation of disposing the self-capacitance electrodes, the block electrodes, the first wires and the second wires on a side of the top substrate that faces the bottom substrate are all similar to the above-mentioned implementation, and will not be repeated any more.

In at least one embodiment of the present invention, when the self-capacitance electrodes, the block electrodes, the first wires and the second wires are disposed on a side of the bottom substrate, which side faces the top substrate, it is possible to dispose the self-capacitance electrodes, the block electrodes, the first wires and the second wires at any positions on the side of the bottom substrate, which side faces the top substrate.

The specific implementation of disposing the self-capacitance electrodes, the block electrodes, the first wires and the second wires on a side of the bottom substrate that faces the top substrate is similar to the specific implementation of disposing the self-capacitance electrodes, the block electrodes, the first wires and the second wires on a side of the top substrate that faces the bottom substrate, and will not be repeated here any more.

In at least one embodiment of the present invention, when the self-capacitance electrodes, the block electrodes, the first wires and the second wires are disposed on a side of the bottom substrate that faces the top substrate, the self-capacitance electrodes and block electrodes are used as a common electrode layer as well.

In at least one embodiment of the present invention, using the self-capacitance electrodes and block electrodes as the common electrode layer can save a layer and reduce the complexity of manufacturing in-cell touch panel in embodiments of the present invention.

At least one embodiment of the present invention further provides a display device comprising the in-cell touch panel provided in any embodiment of the present invention. The display device may be any product or component having display function such as a cellphone, a tablet computer, a TV set, a display, a notebook computer, a digital picture frame, a navigator and so on. The above-mentioned embodiments of the in-cell touch panel may be referred to for implementations of the display device and descriptions will not be repeated any more.

Since the number of wires in the in-cell touch panel described in at least one embodiment of the present invention is reduced, it allows the number of wires in the display device comprising the in-cell touch panel provided in the embodiments of the present invention to be reduced too, and is favorable to the narrow margin frame design of the display device, reducing the touch dead zone in the display device and reducing costs of the display device.

At least one embodiment of the present invention further provides a display device comprising an add-on mode touch panel comprising: the capacitive touch structure provided in embodiments of the present invention. The display device may be any product or component having display function such as a cellphone, a tablet computer, a TV set, a display, a notebook computer, a digital picture frame and a navigator. The above-mentioned embodiments of the capacitive touch structure may be referred to for implementations of the display device and the description will not be repeated any more.

Because the number of wires in the capacitive touch structure described in at least one embodiment of the present invention is reduced, it allows the number of wires in the add-on mode touch panel comprising the capacitive touch structure provided in an embodiment of the present invention to be reduced and further allows the number of wires in the display device comprising the add-on mode touch panel to be reduced too, and is favorable to the narrow margin frame design of the display device, reducing touch dead zone in the display device and reducing costs of the display device.

At least one embodiment of the present invention further provides a scanning method for the display device, comprising: conducting touch scanning and display scanning in a time-division manner in one frame period.

In the touch scanning interval, the touch sensing chip applies driving signals to block electrodes at the same time through second wires and periphery wirings connected with the block electrodes; applies driving signals to self-capacitance electrodes in a time-division manner through first wires and periphery wirings connected with the self-capacitance electrodes; and receives feedback signals of the self-capacitance electrodes and the block electrodes and determines touch positions according to feedback signals.

In at least one embodiment of the present invention, conducting touch scanning and display scanning in a time-division manner can reduce mutual interference between display signals and touch signals and enhance picture quality and touch accuracy. In specific implementations, it is possible to integrate the display driving chip and the touch sensing chip into one chip to reduce the production costs.

The scanning method for the display device in the embodiment of the present invention will be described in detail below with reference to FIG. 6.

As shown in FIG. 6, the period for the display device to display each frame (V-sync) is divided into a display scanning interval (Display) and a touch scanning interval (Touch). For example, the period for the display device to display one frame is 16.7 milliseconds (ms), of which 5 ms is selected as the touch scanning interval, and the rest 11.7 ms as display scanning interval. Of course it is also possible to appropriately adjust durations of both according to the processing capacity of IC chips, which is not specifically limited here.

In the display scanning interval (Display), gate signal lines Gate 1, Gate 2, . . . Gate n in the display device are applied with gate scanning signals successively and data signal lines Data are applied with gray scale signals to implement display function.

In the touch interval (Touch), the touch sensing chip applies driving signals to the block electrodes pad 1 . . . pad m at the same time and applies driving signals to self-capacitance electrodes Cx 1 . . . Cx n in a time-division manner, and at the same time, receives feedback signals of self-capacitance electrodes Cx 1 . . . Cx n and block electrodes pad 1 . . . pad m, and determines touch positions by analyzing feedback signals of self-capacitance electrodes Cx 1 . . . Cx n and block electrodes pad 1 . . . pad m, thereby implementing touch function.

In at least one embodiment of the present invention, when the self-capacitance electrodes and the block electrodes are disposed on a side of the bottom substrate that faces the top substrate, and the self-capacitance electrodes and the block electrodes are used as a common electrode layer, in the display scanning interval (Display), a Vcom voltage is applied to the self-capacitance electrodes and the block electrodes. This can guarantee the normal display of the display device.

In at least one embodiment of the present invention, when the self-capacitance electrodes and the block electrodes are disposed on a side of the top substrate that faces the bottom substrate, in the display scanning interval (Display), a floating voltage is applied to the self-capacitance electrodes and the block electrodes.

It is possible to avoid forming direct straight electric field between self-capacitance electrodes and block electrodes on the top substrate and electrodes on the bottom substrate to avoid negative impact on the display of display device to a certain extent.

In applying driving signals to self-capacitance electrodes in a time-division manner, the touch sensing chip may scan self-capacitance electrodes one by one in a transverse direction to apply driving signals to self-capacitance electrodes in a time-division manner; and may also scan self-capacitance electrodes one by one in a vertical direction to apply driving signals to self-capacitance electrodes.

What are described above is related to the illustrative embodiments of the disclosure only and not limitative to the scope of the disclosure; the scopes of the disclosure are defined by the accompanying claims.

The present application claims priority of China Patent application No. 201410240507.4 filed on May 30, 2014, the content of which is incorporated in its entirety as part of the present application by reference herein.

The invention claimed is:

1. A capacitive touch structure comprising:
a plurality of self-capacitance electrodes disposed in a same layer and insulated from each other;
a plurality of block electrodes disposed in a same layer as the self-capacitance electrodes and insulated from the self-capacitance electrodes, wherein at least adjacent self-capacitance electrodes satisfy the following conditions: at least two block electrodes are provided between any two adjacent self-capacitance electrodes, and each of the at least two block electrodes corresponds to only one self-capacitance electrode;
a plurality of first wires electrically connected with the self-capacitance electrodes while not intersecting each other, wherein the self-capacitance electrodes are each electrically connected with different first wires;
a plurality of second wires electrically connected with the block electrodes while not intersecting each other, wherein block electrodes corresponding to one self-capacitance electrode are electrically connected with a same one second wire, block electrodes corresponding to adjacent self-capacitance electrodes are electrically connected with different second wires, and one of the second wires is electrically connected with block electrodes corresponding to at least two self-capacitance electrodes; and
a touch sensing chip electrically connected with the first wires and second wires.

2. The capacitive touch structure of claim 1, wherein the self-capacitance electrodes are arranged in a matrix, and two block electrodes are provided between any two adjacent self-capacitance electrodes, each of the two block electrodes corresponds to one self-capacitance electrode of the two adjacent self-capacitance electrodes, and each of the block electrodes corresponds to a different self-capacitance electrode.

3. The capacitive touch structure of claim 2, wherein each of the self-capacitance electrodes is provided with block electrodes corresponding to itself and disposed around it, and
block electrodes around each self-capacitance electrode form a closed region surrounding the self-capacitance electrode.

4. The capacitive touch structure of claim 3, wherein the first wires and the self-capacitance electrodes are disposed in different layers.

5. The capacitive touch structure of claim 4, wherein the second wires and the block electrodes are disposed in a same layer;
each column of the block electrodes are connected with two of the second wires, one of the two second wires is connected with odd numbered rows of the block electrodes, and the other of the two second wires is connected with even numbered rows of the block electrodes; or
each row of the block electrodes are connected with two of the second wires, one of the two second wires is connected with odd numbered columns of the block electrodes, and the other of the two second wires is connected with even numbered columns of the block electrodes.

6. The capacitive touch structure of claim 5, wherein the first wires connect the self-capacitance electrodes to a margin frame of the touch panel;
and the second wires connect the block electrodes to the margin frame of the touch panel;
the touch panel further comprises periphery wirings at the margin frame of the touch panel which are electrically connected with the first wires and the second wires; and
the touch sensing chip is electrically connected with the periphery wirings via connection terminals.

7. The capacitive touch structure of claim 6, wherein each column of the block electrodes is connected with at least two of the second wires; and
the margin frame of the touch panel is of a rectangle shape, and extension directions of the first wires and second wires are consistent with a direction of a short side of the margin frame.

8. The capacitive touch structure of claim 3, wherein the first wires connect the self-capacitance electrodes to a margin frame of the touch panel;
and the second wires connect the block electrodes to the margin frame of the touch panel;
the touch panel further comprises periphery wirings at the margin frame of the touch panel which are electrically connected with the first wires and the second wires; and
the touch sensing chip is electrically connected with the periphery wirings via connection terminals.

9. The capacitive touch structure of claim 8, wherein each column of the block electrodes is connected with at least two of the second wires; and
the margin frame of the touch panel is of a rectangle shape, and extension directions of the first wires and second wires are consistent with a direction of a short side of the margin frame.

10. The capacitive touch structure of claim 2, wherein the first wires connect the self-capacitance electrodes to a margin frame of the touch panel;

and the second wires connect the block electrodes to the margin frame of the touch panel;

the touch panel further comprises periphery wirings at the margin frame of the touch panel which are electrically connected with the first wires and the second wires; and the touch sensing chip is electrically connected with the periphery wirings via connection terminals.

11. The capacitive touch structure of claim 10, wherein each of the self-capacitance electrodes is provided with block electrodes corresponding to itself and disposed around it, and the block electrodes around each self-capacitance electrode form a closed region surrounding the self-capacitance electrode; and each column of the block electrodes is connected with at least two of the second wires; and the margin frame of the touch panel is of a rectangle shape, and extension directions of the first wires and second wires are consistent with a direction of a short side of the margin frame.

12. The capacitive touch structure of claim 2, wherein opposite sides of adjacent two of self-capacitance electrodes are both fold lines;

the opposite sides of adjacent two self-capacitance electrodes that are fold lines both have step-like structures that are consistent and matching each other; and/or the opposite sides of adjacent two self-capacitance electrodes that are fold lines both have concave-convex structures that are consistent and matching each other.

13. The capacitive touch structure of claim 1, wherein opposite sides of adjacent two of self-capacitance electrodes are both fold lines;

the opposite sides of adjacent two self-capacitance electrodes that are fold lines both have step-like structures that are consistent and matching each other; and/or the opposite sides of adjacent two self-capacitance electrodes that are fold lines both have concave-convex structures that are consistent and matching each other.

14. An in-cell touch panel comprising a top substrate and a bottom substrate disposed oppositely to each other and the capacitive touch structure of claim 1;

wherein the self-capacitance electrodes, the block electrodes, the first wires and the second wires are disposed on a side of the top substrate, which side faces the bottom substrate, or on a side of the bottom substrate, which side faces the top substrate.

15. The in-cell touch panel of claim 14, further comprising: a black matrix layer disposed on a side of the top substrate facing the bottom substrate or on a side of the bottom substrate facing the top substrate;

wherein orthogonal projections of the self-capacitance electrodes, the block electrodes, the first wires and the second wires on the bottom substrate are within an orthogonal projection of the black matrix layer on the bottom substrate.

16. The in-cell touch panel of claim 15, wherein a pattern of orthogonal projections of the self-capacitance electrodes and block electrodes on the bottom substrate is of a mesh structure within the orthogonal projection of the black matrix layer on the bottom substrate.

17. The in-cell touch panel of claim 15, wherein the black matrix layer is located on a side of the top substrate that faces the bottom substrate, and a color filter layer is further disposed on the black matrix layer; and the self-capacitance electrodes, the block electrodes and the second wires are disposed in a same layer and between the black matrix layer and the color filter layer;

the first wires are located on the color filter layer and electrically connected with corresponding self-capacitance electrodes through via holes in the color filter layer.

18. The in-cell touch panel of claim 9, wherein the self-capacitance electrodes, the block electrodes, the first wires and the second wires are disposed on a side of the bottom substrate that faces the top substrate; and the self-capacitance electrodes and the block electrodes are used as a common electrode layer.

19. A display device comprising the capacitive touch structure of claim 1.

20. A scanning method for the display device of claim 19, comprising:

conducting touch scanning and display scanning in a time-division manner in one frame period; wherein;

in a touch scanning interval, the touch sensing chip applies driving signals to block electrodes at the same time through second wires and periphery wirings connected with block electrodes; and applies driving signals to self-capacitance electrodes in a time-division manner through first wires and periphery wirings connected with self-capacitance electrodes; receives feedback signals of self-capacitance electrodes and block electrodes, and determines touch positions according to feedback signals.

* * * * *